(12) United States Patent
Asaf et al.

(10) Patent No.: US 11,194,841 B2
(45) Date of Patent: Dec. 7, 2021

(54) VALUE CLASSIFICATION BY CONTEXTUAL CLASSIFICATION OF SIMILAR VALUES IN ADDITIONAL DOCUMENTS

(71) Applicant: International Business Machines Corporation, Armonk, NY (US)

(72) Inventors: Sigal Asaf, Zichron Yaakov (IL); Ariel Farkash, Shinshit (IL); Micha Gideon Moffie, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 16/698,986

(22) Filed: Nov. 28, 2019

(65) Prior Publication Data

US 2021/0165807 A1     Jun. 3, 2021

(51) Int. Cl.
    *G06F 16/28*      (2019.01)
    *G06N 20/00*      (2019.01)
    *G06F 16/93*      (2019.01)

(52) U.S. Cl.
    CPC ............ *G06F 16/285* (2019.01); *G06F 16/93* (2019.01); *G06N 20/00* (2019.01)

(58) Field of Classification Search
    CPC ....... G06F 16/285; G06F 16/93; G06F 21/604
    See application file for complete search history.

(56) References Cited

U.S. PATENT DOCUMENTS

| 2014/0297269 A1 | 10/2014 | Qian |
| 2015/0324606 A1 | 11/2015 | Grondin |
| 2017/0235824 A1 | 8/2017 | Liu |
| 2018/0067916 A1* | 3/2018 | Tsuchiya ................. G06F 40/18 |

FOREIGN PATENT DOCUMENTS

CN          109543084 A      3/2019

* cited by examiner

*Primary Examiner* — Hau H Hoang
(74) *Attorney, Agent, or Firm* — Gassner Intellectual Property

(57) ABSTRACT

Automated classification, by: Obtaining an examined document having an examined value appearing therein. Identifying: a location in the examined document at which the examined value appears, and a structure of the examined value. Identifying additional documents of a same type as the examined document, in which values having a same structure as the examined value appear at a same location as in the examined document. Applying a classifier to the examined value and the values in the additional documents, to output a single class to which the examined value and the values in the additional documents belong.

16 Claims, 2 Drawing Sheets

VALUE CLASSIFICATION BY CONTEXTUAL CLASSIFICATION OF SIMILAR VALUES IN ADDITIONAL DOCUMENTS

BACKGROUND

The invention relates to the field of automated data classification.

Data classification is a prominent machine learning task, involving automated classification of data such as texts, images, audio, and video into predefined categories ("classes").

To produce a classification algorithm (termed "classifier"), vast amounts of training data are typically gathered and are manually assigned labels by human reviewers. Then, various machine learning techniques are used to train the classifier based on the training data, so that it is later able to automatically infer a classification for a new piece of data.

Use of document and value classification algorithms has seen a sharp increase since the introduction of new worldwide and local privacy regulations in recent years. These regulations mandate the protection of digitally-stored person-specific data against unauthorized use, sharing with third parties, or across regions and borders. Failure by enterprises to comply with data privacy regulations may lead to regulatory action and reputational harm. As such, service providers such as financial institutions, healthcare providers, online retailers, or any other enterprise digitally hosting large amounts of customers' personal information, must protect that information from intentional misuse and/or misappropriation, as well as unintentional leaks. But to protect personal information, it must first be identified in the vast data stored by organizations, which is where classification algorithms come into play. Despite the existence of many such algorithms, certain types of personal information are still difficult to automatically detect or to properly classify into the correct sub-type of personal information.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a method comprising: automatically obtaining an examined document having an examined value appearing therein; automatically identifying: a location in the examined document at which the examined value appears, and a structure of the examined value; automatically identifying additional documents of a same type as the examined document, in which values having a same structure as the examined value appear at a same location as in the examined document; and automatically applying a classifier to the examined value and the values in the additional documents, to output a single class to which the examined value and the values in the additional documents belong.

Another embodiment relates to a system comprising: (a) at least one hardware processor; and (b) a non-transitory computer-readable storage medium having program code embodied therewith, the program code executable by said at least one hardware processor to: automatically obtain an examined document having an examined value appearing therein; automatically identify: a location in the examined document at which the examined value appears, and a structure of the examined value; automatically identify additional documents of a same type as the examined document, in which values having a same structure as the examined value appear at a same location as in the examined document; and automatically apply a classifier to the examined value and the values in the additional documents, to output a single class to which the examined value and the values in the additional documents belong.

A further embodiment relates to a computer program product comprising a non-transitory computer-readable storage medium having program code embodied therewith, the program code executable by at least one hardware processor to: automatically obtain an examined document having an examined value appearing therein; automatically identify: a location in the examined document at which the examined value appears, and a structure of the examined value; automatically identify additional documents of a same type as the examined document, in which values having a same structure as the examined value appear at a same location as in the examined document; and automatically apply a classifier to the examined value and the values in the additional documents, to output a single class to which the examined value and the values in the additional documents belong.

In some embodiments, said automatic identification of the additional documents of the same type comprises identifying documents which are stored, in a document repository, under a same category or folder as the examined document.

In some embodiments: the classifier is a machine learning classifier, whose application produces classification scores for multiple classes; any value belonging to each of the multiple classes is subject to one or more content restrictions; the method further comprises, or the program code further executable by said at least one hardware processor, prior to outputting the single class, to: automatically adjust the classification scores based on how they deviate from theoretical classification scores statistically expected for random values that are subject to the one or more content restrictions; and the single class outputted is one of the multiple classes having a highest one of the adjusted classification scores.

In some embodiments, the examined value, the values in the additional documents, and the value belonging to each of the multiple classes, are textual, numeric, or alphanumeric.

In some embodiments, the one or more content restrictions are selected from the group consisting of: adherence of a number included in the respective value to a mathematical rule; and adherence of a text included in the respective value to certain structure.

In some embodiments, the classifier is a statistical analysis classifier configured to: automatically determine multiple possible classes of the examined value and the values in the additional documents, wherein each of the multiple possible classes has a known distribution of values; automatically calculate a distribution of the examined value together with the values in the additional documents; and automatically calculate divergence of the calculated distribution from each of the known distributions of the multiple possible classes; wherein the single class outputted is one of the multiple possible classes whose known distribution has the least divergence from the calculated distribution.

In some embodiments, the divergence is calculated as a Kullback-Leibler divergence.

In some embodiments, the method is performed by at least one hardware processor.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is automated classification of a value in a document, by contextual classification of similar values appearing in similar locations in additional documents of the same category. Advantageously, the disclosed technique may be able to correctly classify a value which could theoretically fall into multiple classes, by examining and classifying it in context.

For example, the technique may be used to correctly classify a nine-digit number appearing in a certain document, which could theoretically be a personal ID number of many different countries or organizations, as being a personal ID number of one specific country or organization. This is performed by transforming such single-value classification problem (i.e., one string appearing in one examined document) into a multi-value classification problem, in which additional documents of the same category as the examined document are used for context; similarly-structured value, located in similar locations in these additional documents, undergo classification together with the value in the examined document, thus leading to much superior classification. In the personal ID number example given above, by applying a classifier not only to the nine-digit number in the examined document but also to other nine-digit numbers appearing in similar locations in documents of the same category, the exact country or organization to which this personal ID number belongs can be more accurately determined.

The disclosed technique may be particularly useful for the classification of sensitive and/or personal information included in large document repositories.

Figure 1:
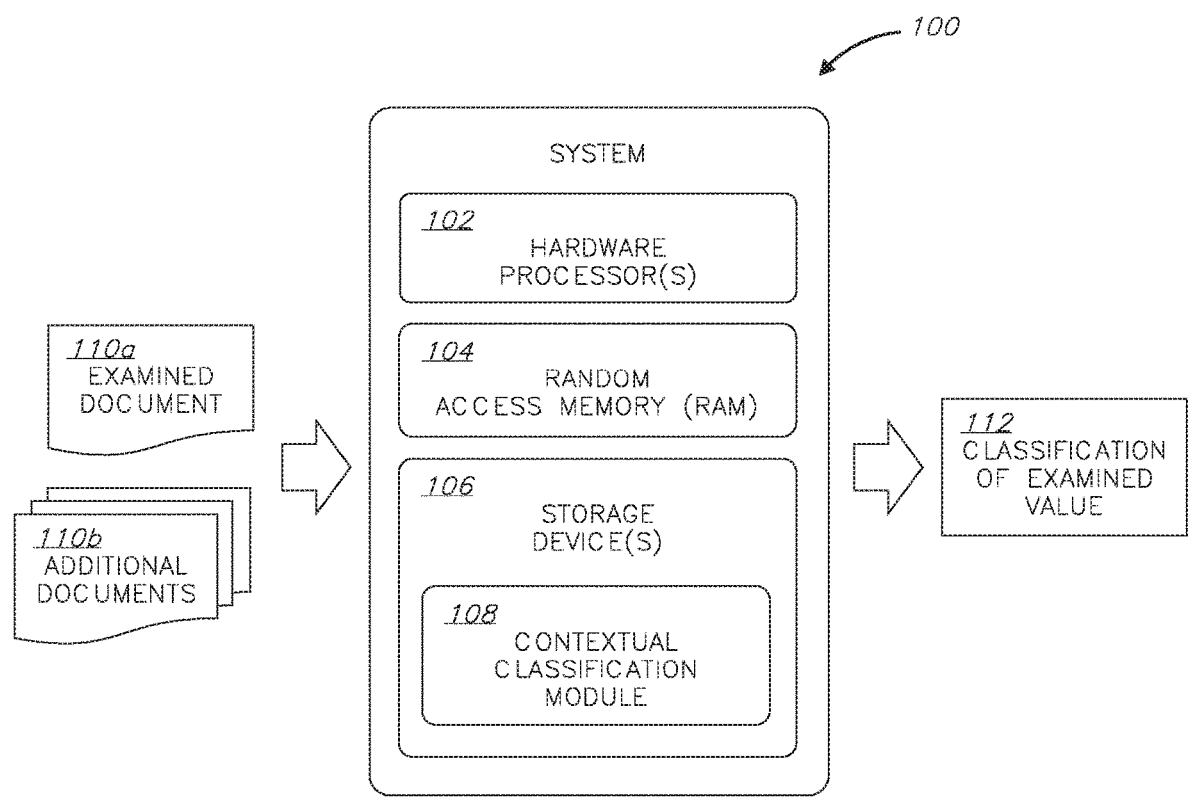
FIG. 1 is a block diagram of an exemplary system for automated data classification, according to an embodiment.

Reference is now made to FIG. 1, which shows a block diagram of an exemplary system 100 for automated data classification, according to an embodiment. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as a contextual classification module 108. The software components may include an operating system having various software components and/or drivers for controlling and managing general system tasks (e.g., memory management, storage device control, power management, etc.), and facilitating communication between various hardware and software components.

System 100 may operate by loading instructions of contextual classification module 108 into RAM 104 as they are being executed by processor(s) 102. The instructions of contextual classification module 108 may cause system 100 to obtain a document 110a having a value requiring classification, to intelligently select additional documents 110b which include similarly-structured values in similar locations, and to output 112 a classification of the value to a single class.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, etc. (not shown). Components of system 100 may be co-located or distributed (e.g., in a distributed computing architecture).

Figure 2:
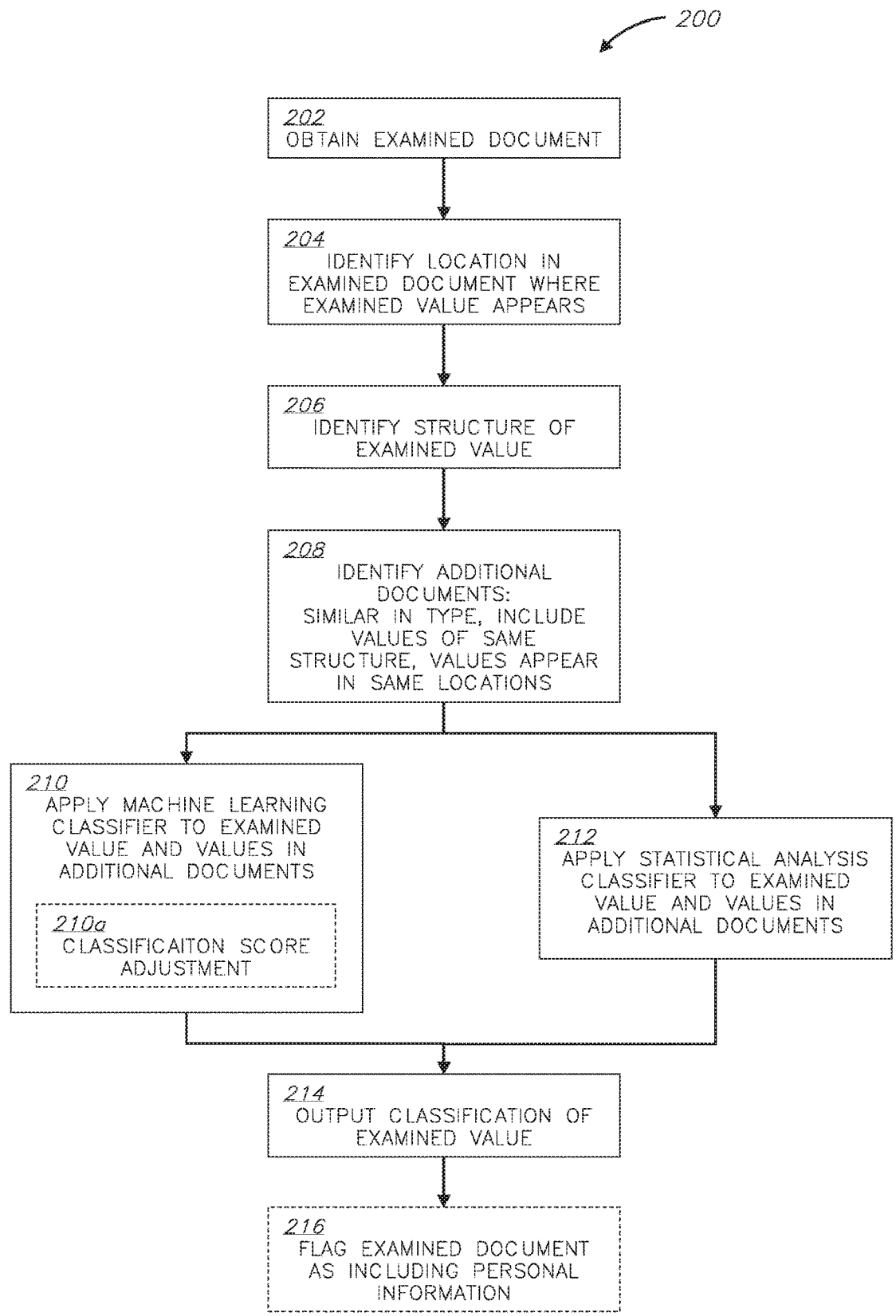
FIG. 2 is a flowchart of a method for automated data classification, according to an embodiment.

The instructions of contextual classification module 108 are now discussed with reference to the flowchart of FIG. 2, which illustrates a method 200 for automated data classification, in accordance with an embodiment.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by system 100 of FIG. 1), unless specifically stated otherwise. Finally, it should be noted that although method 200 is described in the context of classification of one value appearing in one document, it is in fact intended to be repeatedly and rapidly executed for a large number of documents in order to classify values they include.

A step 202 may include obtaining a digital document which has a value requiring classification. The digital document and the value are referred to hereinafter as "examined document" and "examined value," to avoid confusion with other documents and values mentioned below. The examined document may be a textual document, or a document including both text and graphics. Examples include a PDF (Portable Document Format) document, a Microsoft Word (e.g., .doc or .docx) document, an RTF (Rich Text Format) document, an Open Document Text File Format (.odt) document, etc. The examined document may be embodied as a flat file or a hierarchical file. The latter may involve, for example, an archive file (e.g., ZIP, TAR, APK, etc.) including therein multiple files and optionally a folder hierarchy, and the examined value is located inside one of the files.

The examined value may be, for example, a numerical value, a textual value, or an alphanumerical value (including two or more of the following categories: digits, letters, and punctuation/symbols) appearing anywhere in the document.

A step 204 may include identifying a location in the examined document at which the examined value appears. The identified location may entail one or both of the following: First, a path in the hierarchy of the examined document (if it is of the hierarchical type). For example, if the examined document is a Microsoft Word .docx file, which is essentially a ZIP archive, then the path where the examined value appears may be file.docx\word\document.xml (an XML file nested inside a "word" folder inside the ZIP file). Second, a location in the flat file itself where the examined value appears. In the .docx example, the flat file document.xml will be the one including the examined value, and the value's specific location in that file may be identified, for example, by a number of characters counted from the beginning of the file, by line number and column number, by location within a specific tag structure of the file, or by any other known means.

A step 206 may include identifying a structure of the examined value, such as whether it is a numerical value, a textual value, or an alphanumeric value, and what is its length. As illustrative examples, the structure may be of a nine-digit numeric string, or of three letters, a hyphen, and five digits.

Then, in a step 208, multiple additional documents are identified, which satisfy the following three conditions: they are similar in type to the examined document, they include values having a same structure as the examined value, and these values appear at a same location as in the examined document.

Identifying documents that match the first condition may involve, for example, obtaining documents from the same folder in a digital document repository (e.g., a file server) where the examined document was stored. This may prove useful if the document repository is organized in a folder hierarchy by the type of documents, so that documents of the same type (e.g., patient discharge forms in a document repository of a hospital) are stored in the same folder or in sub-folders under one common folder denoting the type. Another option which may be supported by the pertinent document repository is to fetch documents by metadata stored by the repository. This metadata may identify the category of the document, so that if the examined document had the metadata "category:patient discharge form," documents with the same metadata can be easily searched for.

Identifying documents that match the second condition (they include values having a same structure as the examined value) may involve performing a search in the document repository with a query to find those values which have the same structure as the examined value. Such query may include, for example, a suitable regular expression (RegEx) which expresses the pertinent structure, as known in the art.

Identifying documents that match the third condition (the values appear at a same location as in the examined document) may be performed by including, in the query to the document repository, an indication of the location of the examined value inside the examined document. For example, the query may be directed to values located in the file.docx\word\document.xml path of a Microsoft Word .docx file, immediately following the text string "ID number:" inside that XML file.

In a variant of method 200, the examined document is not of a recurring type. In other words, it is not a document which is regularly generated, based on the same format or template, such as a patient discharge form, a goods purchase order, or a lease agreement. It could be, for example, an email message phrased with free language, making it different vastly than any other document stored in the document repository. Accordingly, an attempt to identify additional documents that are similar to it, in step 208, will fail. In such cases, the following tweak to method 200 may be employed: the examined document may be searched for the existence of a string that is an identifier of the document or of one of the topics discussed in the document. For example, an email message, or a letter stored electronically, may mention a patient ID number (do not confuse this patient ID number with the examined value, which is a different string appearing in the email or letter, such as a textual string). This patient ID number, which may be automatically discovered using a suitable RegEx, may be leveraged for searching the document repository for documents including the same patient ID number, namely—they concern the same patient.

Once such documents are found, they may be searched for the examined value. If it is found in any of them—then the pertinent document may serve as the examined document for purposes of method 200, and steps 202-208 may be performed based on it instead of the original examined document.

When step 208 completes, there are multiple additional documents available, in which values of the same type and location as the examined value exist.

Next, a classifier may be applied to the examined value and the values in these additional documents, in order to determine which class they belong to. This may be, for example, a machine learning classifier applied in a step 210, or a statistical analysis classifier applied in a step 212. Either step expresses the approach taken by embodiments of the present invention, to reformulate the single-value (i.e., examined value) classification problem as a multi-value (i.e., examined value plus values from the additional documents) classification problem. Namely, the examined value is classified in the context of additional values which very likely to belong to its class—since they appear in documents of the same type, have the same structure, and are located in their respective documents in the same location.

Step 210 may utilize a machine learning classifier trained on a training set of values that were manually labeled by their classes, as known in the art.

Returning to the nine-digit personal ID number example, consider a case where the examined value could be either a U.S. Social Security Number (SSN), an Israeli ID number, or a hospital patient ID. By classifying the examined value together with other nine-digit numbers which were found in the same location in documents of the same type, it is highly likely that the patterns found by the classifier in all these nine-digit numbers will reveal their true class.

By way of another example, consider the following examined value: "Watson". This could be a surname, a city in Chippewa County, Minn., United States, or the name of IBM Corporation's suite of artificial intelligence tools. However, if the identification of additional documents reveals that they include, in the same location, similarly-structured strings such as "Learson," "Cary," "Akers," and "Gerstner," a suitable classifier can readily and accurately classify "Watson" as a surname and not as a city or a software tool.

Optionally, prior to outputting the single class, a classification score adjustment process 210a takes place, in order to increase the accuracy of the outputted class. To this end, the machine learning classifier produces classification scores for multiple classes—those classes it was trained to classify into. For example, if the classifier was trained to classify values into SSNs, Israeli IDs, and hospital patient IDs, it may produce classification scores (typically between 0 and 1) for each class, such as 0.91 for SSN, 0.95 for Israeli ID, and 1.0 for hospital patient ID. Now, it is required to decide which of these classes will be output as the single-class which the examined value (and the values of the additional documents) most likely belongs to. In naïve classification solutions, the highest-scoring class is usually the one selected, in this case—the hospital patient ID. However, in certain cases, the highest-scoring class may be the incorrect one, because the scores are biased by certain restrictions (or lack of restrictions) on the contents of the classified values:

An SSN is divided into three groups of digits: a three-digit number serving as an area code, and restricted to values between 001 and 889, excluding 666; a two-digit number serving as a group number, are restricted to values between 01 and 99; and a four-digit number serving as a serial number and restricted to numbers between 0001 and 9999.

An Israeli ID number is comprised of eight digits, and the ninth digit is restricted to one satisfying a Luhn checksum of the former eight digits.

A hospital patient ID, let us assume for the sake of discussion, has no restrictions whatsoever on its nine digits.

It is clear, therefore, that a naïve classifier will, on average, incorrectly produce very high classification score for the class "hospital patient ID" no matter what the nine-digit value is (simply because a hospital patient ID is not restricted to any pattern), a slightly lower score for the class "SSN" (because most, but not all nine-digit numbers adhere to the SSN content restrictions), and a considerably lower score for the class "Israeli ID" (because its Luhn checksum restriction make only about 10% of all nine-digit numbers eligible to be Israeli IDs).

Advantageously, step 210a includes an automated adjustment of the multiple classification scores produced by the machine learning classifier, based on how they deviate from theoretical classification scores statistically expected for random values that are subject to the one or more content restrictions. In the above example, the adjustment will cause the Israeli ID score to be the highest, and will decrease the scores of the SSN and hospital patient ID scores. This is because the chances of a random Israeli ID to yield such a score of 0.95 while being restricted to about 10% of all possible 9-digit numbers, are extremely low; the fact that this score was nonetheless achieved for the particular 9-digit number is a strong indication that the classifier found a very unique pattern justifying the high score. At the same time, the chances of a random SSN to receive a score of 0.91, and a random hospital patient ID to receive a score of 1.0, are much higher—implying that the classifier based their scores on rather weak indicators, or at least weaker than those of the Israeli ID class.

The adjustment of step 210a may be performed according to the technique in Assaf S., Farkash A., Moffie M., "Multi-value Classification of Ambiguous Personal Data," a chapter in Attiogbé C., Ferrarotti F., Maabout S., New Trends in Model and Data Engineering, October 2019, and in MEDI 2019 International Workshops, pp. 202-208. That technique involves analyzing the one or more restrictions to the contents of the values, to evaluate what theoretical classification scores are expected for random values that are subject to these restrictions. Such restrictions may include, for example, adherence of a number included in a value to a mathematical rule (such as the Luhn checksum example or the restrictions on the various segments of an SSN), or adherence of a text included in the respective value to certain structure (such as may be expressed by a RegEx, for instance the surname example given above).

Table 1 below illustrates the above example of content restrictions of three different types of nine-digit IDs, with the rightmost column indicating what fraction of randomly-generated nine-digit numbers would have satisfied the restrictions.

TABLE 1

Random satisfaction fractions for various content restrictions

| Category | Restriction name | Description | Random Satisfaction Fraction |
|---|---|---|---|
| Israeli ID | Luhn checksum | Last digit satisfies the Luhn checksum | 0.1 |
| SSN | Area code | $d_1d_2d_3 \neq 000$ and $d_1d_2d_3 \neq 666$ and $d_1d_2d_3 < 900$ and | 0.898 |
|  | Group number | $d_4d_5 \neq 00$ | 0.99 |
|  | Serial number | $d_6d_7d_8d_9 \neq 0000$ | 0.999 |
| Hospital patient ID |  | No restrictions | 1.0 |

Resulting from these random satisfaction fractions is the bias that a naïve classifier is likely to introduce into its classification scores. With the technique of Assaf et al. (2019), this bias may be corrected for, using a corresponding adjustment to the classification scores.

Following the adjustment, the class having the highest adjusted classification score is the one selected to be the output 214 of step 210 and hence of method 200, namely—the classification of the examined value.

As noted above, an alternative to the machine learning classifier of step 210 (and its sub-process 210a) may be the use of a statistical analysis classifier, in step 212. This statistical analysis classifier is a series of calculations which ultimately aim to decide which, of a number of possible classes, the examined value (and the values of the additional documents) most likely belongs to. Accordingly, the statistical analysis classifier may be configured to:

First, determine multiple possible classes of the examined value and the values in the additional documents. Each such class may have its own known distribution of values. For example, if the possible classes are blood test parameters (e.g., HDL and LDL), then step 210 may obtain or be pre-provided with information on the known, real-world distribution of these parameters. For HDL, there is typically a distribution with a mean of 1.55 and standard deviation of 0.325, and for LDL, a distribution with a mean of 2.7 and standard deviation of 0.35. The information on the known distributions may alternatively be obtained (or be pre-provided) as histograms or even as distribution functions, to name a few exemplary options.

Second, calculate a distribution of the examined value together with the values in the additional documents. For example, if the examined value is 1.4 and the values in the additional documents are 1.6, 1.5, 1, and 1.7, the distribution of these five values is one with a mean of 1.44 and a standard deviation of 0.241.

Steps one and two are not dependent on one another and can therefore be performed in the opposite order or simultaneously.

Third, calculate divergence of the calculated distribution from each of the known distributions of the possible classes, and select for output that class whose known distribution has the least divergence from the calculated distribution. Back to the previous example, it becomes immediately clear that the divergence of the known HDL distribution (mean 1.55, standard deviation 0.325) from the calculated distribution of the examined value together with the values in the additional documents (mean 1.44, standard deviation 0.241) is much smaller than the divergence of the known LDL distribution (mean 2.7, standard deviation 0.35) from that calculated distribution. It is therefore considerably more likely that the examined value and the values in the additional documents are HDL values and not LDL values, and the HDL class should be the output 214 of the statistical analysis classifier and hence of method 200.

Optionally, the divergence is calculated as a Kullback-Leibler divergence (sometimes called Kullback-Leibler "distance"), as known in the art. Other measures of divergence and similarity applicable here will become apparent to those of skill in the art.

In an optional step 216, it is checked whether the class that the examined value belongs to is considered a class of personal information, for example based on a predefined list of classes of personal information. If so, then the examined document may be flagged as one including personal information, and further actions may be taken based on this flagging. For example, the examined document may be transferred to a document repository physically residing in a certain jurisdiction, in order to comply with pertinent regulation. As another example, greater security protection may be given to that examined document or to the document repository which stores it. Other suitable actions to comply with personal information regulation will become apparent to those of skill in the art.

As used herein, the term "personal information" is intended to broadly encompass all types of information relating to an individual's private, professional, or public life. Personal information can encompass any data point regarding the individual—such as a name, a home address, a photograph, email or phone contact details, bank details, posts on social networking websites, medical information, or a computer's IP address, to name a few. One sub-category of personal information includes "personally identifiable information" (PII), which is information that can be used on its own or with other information to identify, contact, and/or locate an individual. "Sensitive personal information" (SPI) is defined as information that if lost, compromised, or disclosed, could result in substantial harm, embarrassment, inconvenience, or unfairness to an individual. All these types of personal information are ones which are classifiable by embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    automatically obtaining an examined document having an examined value appearing therein;
    automatically identifying: a location in the examined document at which the examined value appears, and a structure of the examined value;
    automatically identifying additional documents of a same type as the examined document, in which values having a same structure as the examined value appear at a same location as in the examined document; and
    automatically applying a classifier to the examined value and the values in the additional documents, to output a single class to which the examined value and the values in the additional documents belong, wherein:
    the classifier is a machine learning classifier whose application produces classification scores for multiple classes,
    any value belonging to each of the multiple classes is subject to one or more content restrictions,
    the method further comprises, prior to outputting the single class: automatically adjusting the classification scores based on how they deviate from theoretical classification scores statistically expected for random values that are subject to the one or more content restrictions, and
    the single class outputted is one of the multiple classes having a highest one of the adjusted classification scores.

2. The method according to claim 1, wherein said automatic identification of the additional documents of the same type comprises identifying documents which are stored, in a document repository, under a same category or folder as the examined document.

3. The method according to claim 1, wherein the examined value, the values in the additional documents, and the value belonging to each of the multiple classes, are textual, numeric, or alphanumeric.

4. The method according to claim 3, wherein the one or more content restrictions are selected from the group consisting of:
    adherence of a number included in the respective value to a mathematical rule; and
    adherence of a text included in the respective value to certain structure.

5. The method according to claim 1, performed by at least one hardware processor.

6. A system comprising:
    (a) at least one hardware processor; and
    (b) a non-transitory computer-readable storage medium having program code embodied therewith, the program code executable by said at least one hardware processor to:
    automatically obtain an examined document having an examined value appearing therein,
    automatically identify: a location in the examined document at which the examined value appears, and a structure of the examined value,
    automatically identify additional documents of a same type as the examined document, in which values having a same structure as the examined value appear at a same location as in the examined document, and
    automatically apply a classifier to the examined value and the values in the additional documents, to output a single class to which the examined value and the values in the additional documents belong, wherein:
    the classifier is a machine learning classifier whose application produces classification scores for multiple classes,
    any value belonging to each of the multiple classes is subject to one or more content restrictions,
    the program code is further executable, prior to outputting the single class, to: automatically adjust the classification scores based on how they deviate from theoretical classification scores statistically expected for random values that are subject to the one or more content restrictions, and
    the single class outputted is one of the multiple classes having a highest one of the adjusted classification scores.

7. The system according to claim 6, wherein said automatic identification of the additional documents of the same type comprises identifying documents which are stored, in a document repository, under a same category or folder as the examined document.

8. The system according to claim 6, wherein the examined value, the values in the additional documents, and the value belonging to each of the multiple classes, are textual, numeric, or alphanumeric.

9. The system according to claim 8, wherein the one or more content restrictions are selected from the group consisting of:
    adherence of a number included in the respective value to a mathematical rule; and
    adherence of a text included in the respective value to certain structure.

10. A method comprising:
automatically obtaining an examined document having an examined value appearing therein;
automatically identifying: a location in the examined document at which the examined value appears, and a structure of the examined value;
automatically identifying additional documents of a same type as the examined document, in which values having a same structure as the examined value appear at a same location as in the examined document; and
automatically applying a classifier to the examined value and the values in the additional documents, to output a single class to which the examined value and the values in the additional documents belong, wherein the classifier is a statistical analysis classifier configured to:
automatically determine multiple possible classes of the examined value and the values in the additional documents, wherein each of the multiple possible classes has a known distribution of values,
automatically calculate a distribution of the examined value together with the values in the additional documents, and
automatically calculate divergence of the calculated distribution from each of the known distributions of the multiple possible classes,
wherein the single class outputted is one of the multiple possible classes whose known distribution has the least divergence from the calculated distribution.

11. The method according to claim 10, wherein the divergence is calculated as a Kullback-Leibler divergence.

12. The method according to claim 10, wherein the examined value, the values in the additional documents, and the value belonging to each of the multiple classes, are textual, numeric, or alphanumeric.

13. The method according to claim 10, performed by at least one hardware processor.

14. A system comprising:
(a) at least one hardware processor; and
(b) a non-transitory computer-readable storage medium having program code embodied therewith, the program code executable by said at least one hardware processor to:
automatically obtain an examined document having an examined value appearing therein,
automatically identify: a location in the examined document at which the examined value appears, and a structure of the examined value,
automatically identify additional documents of a same type as the examined document, in which values having a same structure as the examined value appear at a same location as in the examined document, and
automatically apply a classifier to the examined value and the values in the additional documents, to output a single class to which the examined value and the values in the additional documents belong, wherein the classifier is a statistical analysis classifier configured to:
automatically determine multiple possible classes of the examined value and the values in the additional documents, wherein each of the multiple possible classes has a known distribution of values,
automatically calculate a distribution of the examined value together with the values in the additional documents, and
automatically calculate divergence of the calculated distribution from each of the known distributions of the multiple possible classes,
wherein the single class outputted is one of the multiple possible classes whose known distribution has the least divergence from the calculated distribution.

15. The system according to claim 14, wherein the divergence is calculated as a Kullback-Leibler divergence.

16. The system according to claim 14, wherein the examined value, the values in the additional documents, and the value belonging to each of the multiple classes, are textual, numeric, or alphanumeric.

* * * * *